Nov. 23, 1943.   H. C. FRENCH   2,334,918
HYDRAULIC STEERING GEAR
Filed June 5, 1942   3 Sheets-Sheet 1
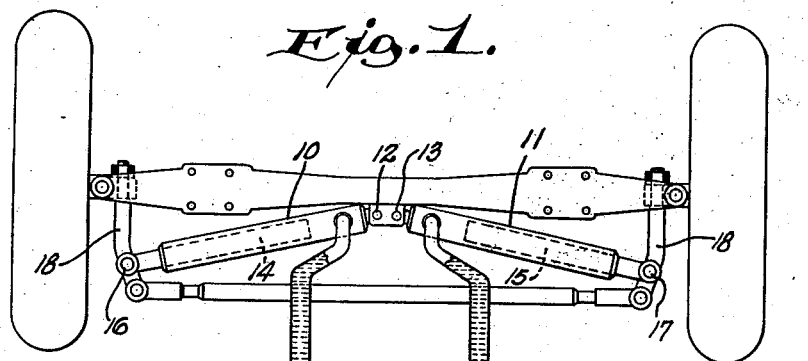
Fig. 1.
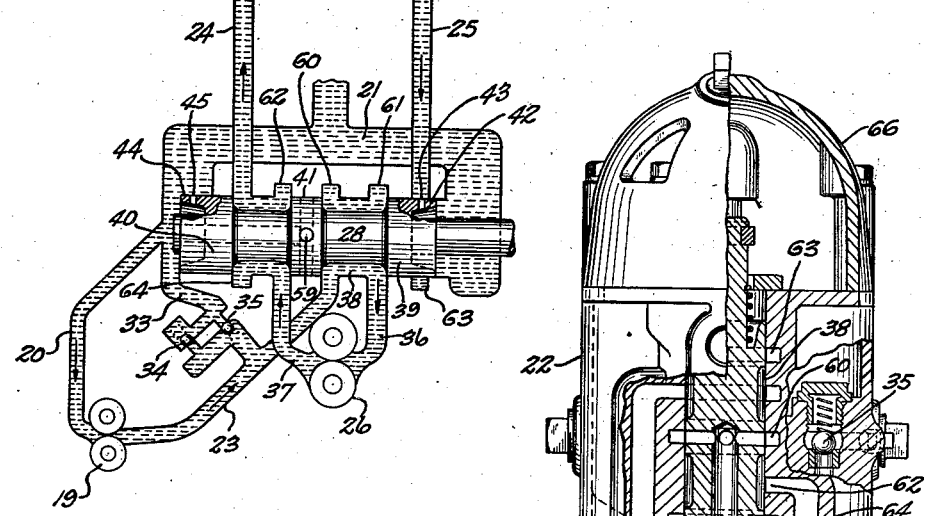
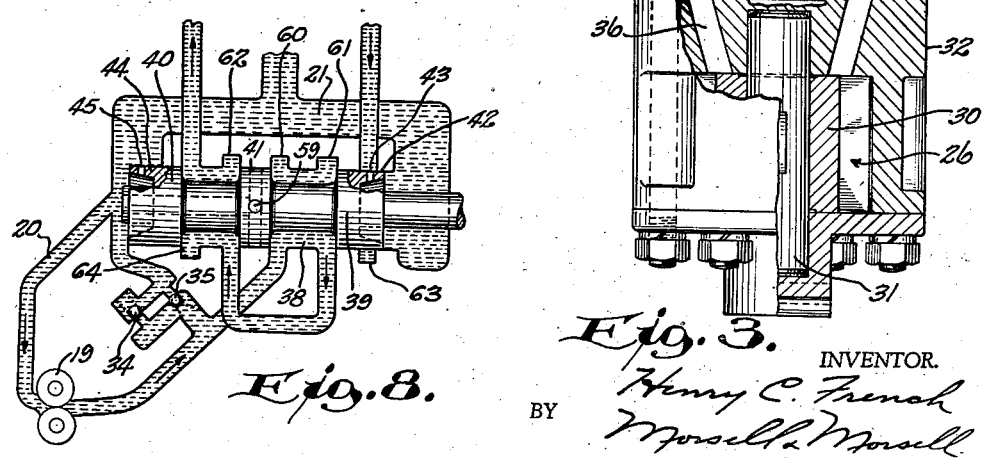
Fig. 8.   Fig. 3.
INVENTOR.
Henry C. French
BY Morsell & Morsell
ATTORNEYS.

Nov. 23, 1943. H. C. FRENCH 2,334,918
HYDRAULIC STEERING GEAR
Filed June 5, 1942 3 Sheets-Sheet 2
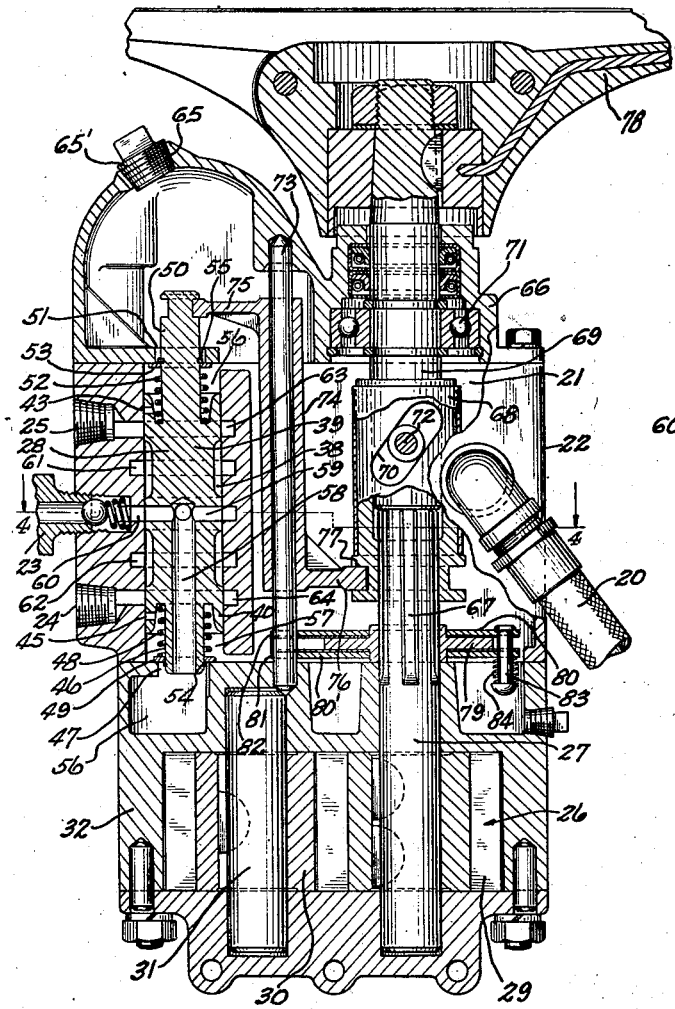
Fig. 2.
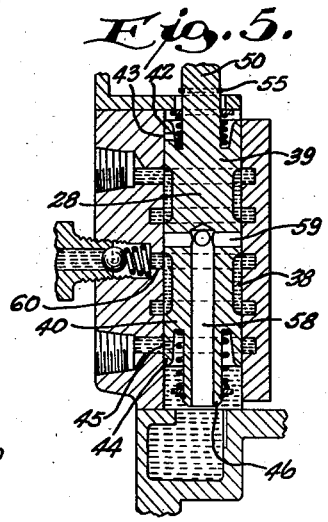
Fig. 5.
Fig. 6.
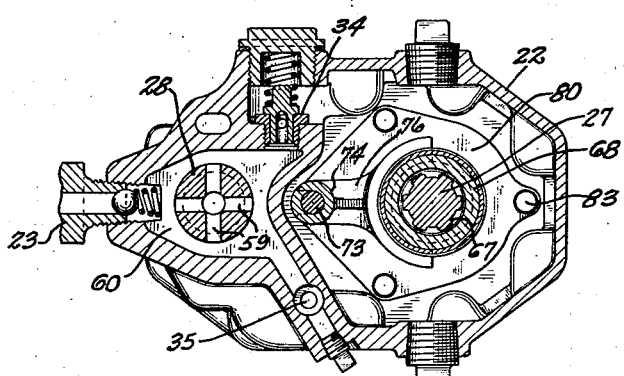
Fig. 4.
INVENTOR.
Henry C. French
BY Morsell & Morsell
ATTORNEYS.

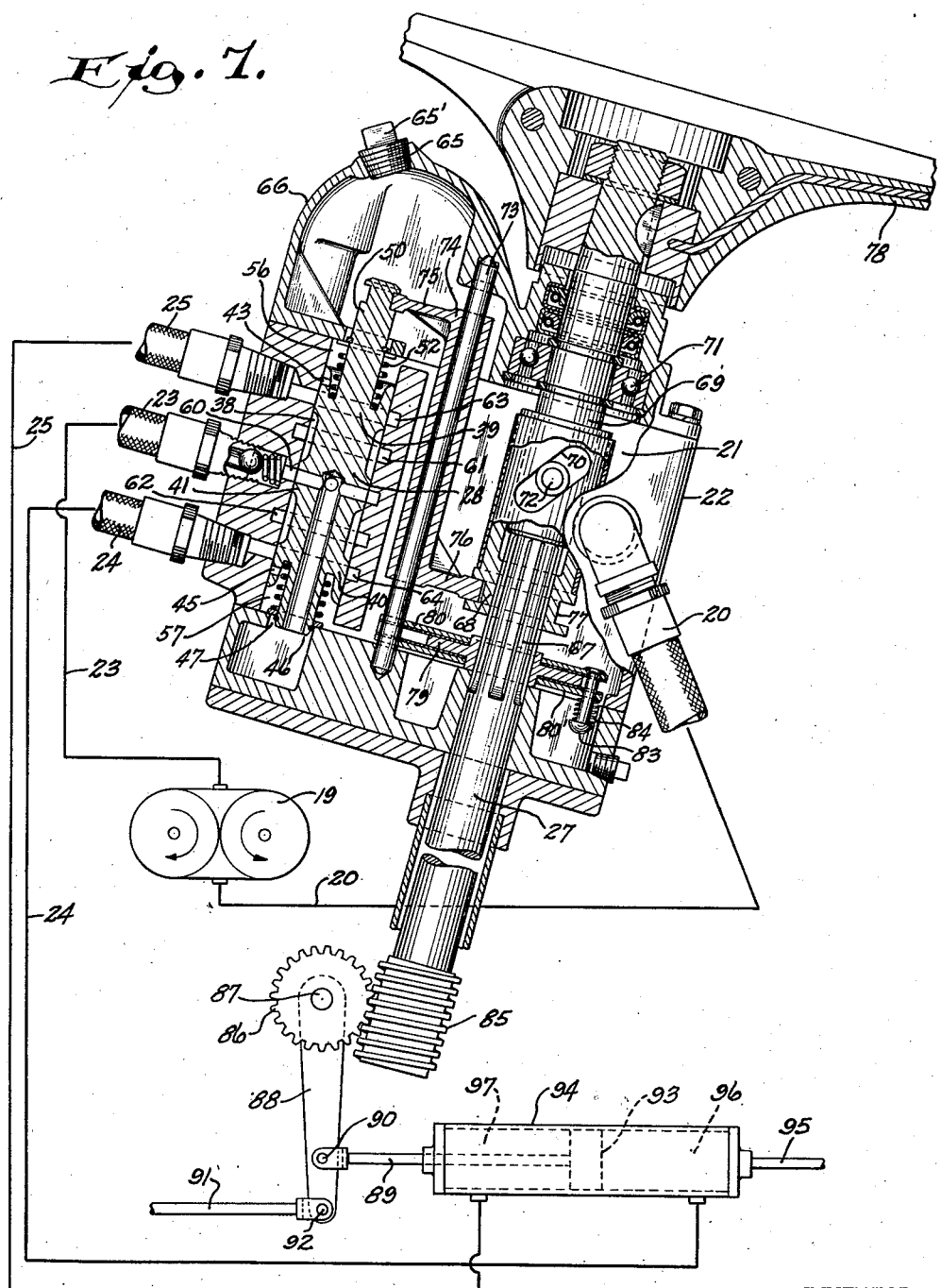

Patented Nov. 23, 1943

2,334,918

UNITED STATES PATENT OFFICE 2,334,918

HYDRAULIC STEERING GEAR

Henry C. French, Elm Grove, Wis., assignor to The Heil Co., Milwaukee, Wis., a corporation of Wisconsin Application June 5, 1942, Serial No. 445,941

16 Claims. (Cl. 180—79.2)

This invention relates to improvements in hydraulic steering gears.

In my application Serial No. 349,039, filed August 1, 1940, now Patent No. 2,321,377, dated June 8, 1943, there is disclosed a hydraulic steering gear construction wherein a power pump is employed for creating hydraulic pressure to normally cause steering in a selected direction under the manual control of the operator, and wherein there is a second pump operable manually by rotation of the steering wheel which also functions to create hydraulic pressure so that in case of a failure in the power pump steering can still be satisfactorily performed.

It is a general object of the present invention to provide a construction which is an improvement upon the above described device. In the prior application there is a selective control valve which is operated through mechanical connections with the upper section of the steering column. Said upper section is in turn specially connected to an alined lower steering column section which operates the manual or auxiliary pump. Proper valve actuation in the prior application, due to the structural arrangement therein, is dependent upon a good fit of the gears in the manual gear pump so as to eliminate the possibility of slippage, and is dependent upon the manual gear pump being properly filled with oil, otherwise the manual pump would fail to offer the desired resistance to turning movement of the lower steering column section which is necessary in order to have the upper section rotate independently and cause valve actuation when said valve actuation is required. In the present application, novel structure is utilized to provide a more positive method of preventing rotation of the lower steering column section when such rotation would interfere with proper valve actuation.

A further object of the present invention is to provide means for positively preventing oversteering and for preventing damage to the hydraulic system when the wheels encounter abnormal road conditions. Thus the present invention is rendered entirely practical for use on road building vehicles.

A more specific object of the present invention is to accomplish the above mentioned objective by the use of a novel arrangement of restrictive ports through which the hydraulic fluid must pass when returning to the reservoir. This construction eliminates the possibility of more oil being forced into the reservoir, because of a sudden outside pressure on the wheels, than the reservoir can accommodate. The restrictive ports are just large enough to take care of the normal return flow caused by the usual steering rate. Thus an excess amount of oil in a given period of time cannot pass through the ports and over steering and other possible difficulties caused by abnormal road conditions is prevented.

A further more specific object of the invention is to provide in a device of the class described improved actuating connections between the upper steering column section and the valve to cause mechanical actuation of said valve in response to rotation of the upper section of the steering column.

A further more specific object of the invention is to provide means including friction disks which normally offer sufficient resistance to turning movement of the lower section of the steering column so that the upper section of the steering column will operate until valve actuation has taken place.

A further object of the invention is to provide a construction as above described wherein the manual pump may be omitted and wherein the lower steering column section is mechanically connected with the vehicle steering gear. Thus in this modification steering is normally performed by the power pump but may be accomplished manually in case of a failure in the hydraulic system connected with said power pump.

Other objects of the invention are to provide a hydraulic steering assemblage which is sensitive in action; which is simple, compact and durable in construction; which may be readily installed as a unit in vehicles of various types; which may be manufactured and operated at moderate cost; and which has all parts readily accessible for inspection or adjustment.

With the above and other objects in view, the invention consists of the improved hydraulic steering gear and all its parts and modifications as set forth in the claims, and all equivalents thereof.

In the accompanying drawings, in which the same reference numerals designate the same parts in all of the views, Fig. 1 is a diagrammatic view showing the improved hydraulic steering system applied to the steering wheels of a vehicle;

Fig. 2 is a central vertical section through the manually operable control and actuating mechanism comprising part of the system of Fig. 1 and showing the control valve in neutral position;

Fig. 3 is an elevational view looking at the left-hand side of the structure of Fig. 2, part being broken away and shown in vertical section;

Fig. 4 is a transverse sectional view taken on line 4—4 of Fig. 2;

Fig. 5 is a fragmentary section similar to Fig. 2 showing the control valve in the maximum elevated position;

Fig. 6 is a view similar to Fig. 5 showing the control valve in the lowermost position;

Fig. 7 is a view principally in vertical section showing a modification, some of the connections being shown diagrammatically; and Fig. 8 is a diagrammatic view similar to Fig. 1 showing the operation of the modification of Fig. 7.

Referring to the drawings, and more particularly to Fig. 1, the improved hydraulic steering system comprises in general a pair of steering gear actuating cylinders 10 and 11 pivotally connected to the axle at an intermediate point as at 12 and 13. Pistons 14 and 15 within the cylinders have their projecting ends or piston rods pivotally connected as at 16 and 17 to the wheel swinging levers 18. A main or power pump 19 operable from the propelling motor of the vehicle, or from any other suitable source, has a suction or inlet conduit 20 communicating with a liquid or oil supply reservoir 21, which reservoir is located within the main housing 22, as shown in Fig. 2. The discharge conduit 23 from the power pump 19 is adapted to communicate, depending upon the position of the control valve, to be hereinafter described, with either of the conduits 24 or 25 connecting with the cylinders 10 and 11. A manual pump 26, operable by the lower steering column section 27 (see Fig. 2), communicates with the discharge conduit 23 from the power pump 19 and also with the conduits 24 and 25 through the medium of the control valve 28.

Both of the pumps 19 and 26 are preferably of the intermeshing gear type, and the gears 29 and 30 of the manually operable pump 26 are secured respectively to the lower steering column section 27 and to a shaft 31. The latter are journalled for rotation in a pump casing 32 which is secured beneath the casing 22 for the reservoir 21 and control valve 28.

The system also includes an adjustable pressure relief valve 34 and a non-return check valve 35. The manual pump 26 is reversible in action and has inlet and discharge conduits 36 and 27 communicating with the bore 38 of the control valve 28 and adapted to be interchangeably connected by valve movement with the discharge conduit 23 from the main pump 19 and with the conduits 24 or 25.

The control valve 28 is slidable in the bore 38 and has opposite end pistons 39 and 40 and an intermediate piston 41 snugly cooperable with the bore 38. The end piston 39 has an annular extension flange 42 formed with a single restrictive opening or port 43 therein. The piston 40 at the opposite end of the valve has a similar annular extension flange 44 formed with a single restrictive opening or port 45.

The valve 28 has a bottom stem 46 slidable through an opening 47. A coil spring 48 surrounding the stem 46 has its lower end seated on a collar 49 which is slidable on the stem. The collar 49 in turn overlaps the marginal edges of the opening 47. Thus when the control valve is moved downwardly, referring to Fig. 2, the spring 48 is compressed.

At the upper end of the control valve is a longer stem 50 which projects through an opening 51. The lower portion of this stem is surrounded by a coil spring 52 which has its upper end cooperable with a slidable collar 53 overlapping the marginal edges of the opening 51. Retaining rings 54 and 55 cooperate with the collars 49 and 53 respectively. A chamber 56 surrounding the lower portion of the stem 50 is in communication with the oil reservoir 21, as shown in Fig. 2, and a chamber 57 surrounding the lower stem 46 is also in communication with the reservoir 21 and with an axial duct 58 in the control valve, which duct extends to the center of the control valve and communicates with radial ducts 59 formed in the intermediate piston 41.

The discharge conduit 33 from the main pump 19 communicates with the central valve chamber 60 with which the radial ducts 59 are in open communication when the valve 28 is in the neutral position of Fig. 2. When the pump 19 is operating with the valve in this neutral position the hydraulic liquid is merely being circulated from the supply reservoir 21 through the conduit 20, pump 19, conduit 23, annular ports 60, radial ducts 59, axial bore 58, chamber 57, back to the reservoir 21.

The valve bore 38 is also provided with annular ports 61 and 62 spaced equidistant from the central annular port 60 and communicating with the conduits 36 and 37 respectively of the manual pump 26. In addition there are opposite end annular ports 63 and 64 communicating with the conduits 25 and 24 respectively, which latter conduits lead to the steering gear operating cylinders 11 and 10. The valve ports 62 and 61 are adapted to be interchangeably and alternately connected, depending upon the position of the valve, either to the central port 60 or to the end ports 63, 64, so as to admit liquid under pressure from the main pump 19, through the manual pump 26, and thence through the valve to either the displacement chamber of the cylinder 10 or the displacement chamber of the cylinder 11 through one of the end annular ports 64 or 63. If hydraulic medium is forced through the conduit 24 to the displacement chamber of the cylinder 10, then the action of the vehicle wheels acting upon the piston in the cylinder 11 will cause return of a corresponding amount of fluid from the displacement chamber of the cylinder 11 to the reservoir.

The main casing 22 may be formed of several sections detachably interconnected, and the reservoir 21 is provided at its highest portion with a filling opening 65 normally closed by a removable plug 65'. The conduits 20, 23, 24, and 25, which communicate with the casing 22, may be flexible so as to permit relative movement of interconnected parts, and the control valve assemblage is housed within the casing 22 above the casing 32 for the manual pump 26, thus providing a unitary reservoir pump and valve assembly. The casing 22 is provided with a removable cover 66, and by virtue of the sectional construction of the casings 22 and 32 all of the enclosed pump and valve parts are readily accessible for inspection and may be readily assembled and dismantled. The relief and non-return valves 34 and 35 may also be housed within the casing 22.

The gears 29 and 30 of the manual pump 26 are snugly fitted within the casing 32 and accurately coact with each other so as to prevent free passage of liquid through this pump. The upper end of the shaft 27 for the gear 29, which forms the lower steering column section, is provided with splines 67 which have sliding coaction with the splined lower portion of a sleeve 68. This sleeve has its upper end open for the reception of the upper steering column section 69 and is also formed with one or more inclined slots 70. The upper steering column section 69 is journalled for rotation in an anti-friction bearing 71 carried by the cover section 66 in axial alinement with the lower steering column section 27. The upper steering column section 69 has snug coaction with the bore of the sleeve 68, while being rotatable therein, and is provided with integral pins 72 extending radially therefrom and coacting with the slot 70 of the sleeve 68.

Intermediate the valve and the steering column is a vertically disposed guide rod 73 on which a valve actuating sleeve 74 is slidable. The upper end of the sleeve 74 has a horizontal extension 75 which is cooperable with the upper end of the valve stem 50, as shown in Fig. 2, to cause actuation of the valve when the sleeve 74 is moved longitudinally on the guide rod 73. The lower end of the sleeve 74 has a similar extension 76 which coacts with a slot 77 at the lower end of the steering column sleeve 68. Thus if the lower steering column section 27 is held against rotation, then when the vehicle steering wheel 78 connected to the upper end of the steering column section 69 is rotated, the upper steering column section 69 will rotate independently of the lower steering column section 27 and the pin 72 will ride in one direction or the other in the slot 70, causing a raising or lowering of the sleeve 68, a raising or lowering of the valve actuating sleeve 74, and movement of the valve 28 in one direction or the other.

In my pending application a proper fit of the gears 29 and 30 of the manual gear pump plus a proper oil level in this pump is relied upon to impose sufficient resistance upon the lower steering column section 27 in order to prevent rotation thereof with the upper steering column section when valve actuation is desired. In the present invention such resistance is imposed independently of the manual pump. Referring to Fig. 2, a disk 79 is splined to the lower steering column section, and this disk fits between bronze facings on the inner sides of plates 80 and 80'. These latter disks are provided with recessed projections 81 and 82 which embrace the guide rod 73 to prevent turning movement of the disks 79 and 80. In addition one or more pins 83 extending through the disk and having coil springs 84 thereon are arranged to yieldingly urge the plates 80 and 80' together. Thus sufficient resistance by friction to turning of the lower steering column section 27 is always present in order to provide for immediate actuation of the valve 28 independently of any resistance to turning movement of the lower steering column section which may be afforded by the manual pump 26. Thus there is a positive mechanically operating valve which is not dependent upon a perfect fit of the gears 29 and 30 and which is not dependent upon a proper oil condition in the hydraulic system. Thus even though the gears 29 and 30 wear to such an extent that there is slippage, proper actuation of the valve will not be affected. Also leaks in the hydraulic system which might effect the oil level in the gear pump 26 will have no effect upon proper valve actuation.

During normal operation of the form of the invention illustrated in Figs. 1 to 6 inclusive, the reservoir 21, pumps, cylinders, passageways, and conduits should first be supplied with an abundance of liquid such as oil and air pockets should be eliminated. When the vehicle steering wheels are set, as in Fig. 1, for straight-line movement of the vehicle, the steering wheel 78 will be disposed so as to place and retain the control valve in the neutral position of Fig. 2. The main or power pump 19 which is being constantly operated by the propelling motor of the vehicle will then withdraw liquid from the reservoir 21 through the suction conduit 20 and will return the liquid to the supply reservoir through the discharge conduit 23, annular port 60, radial ducts 59, axial valve bore 58, and chamber 57 without subjecting the manual pump 26 to pressure. If the steering wheel 78 is shifted from neutral to cause the pins 72 to coact with the slots 70 of the sleeve 68, so as to raise the valve actuating sleeve 74 upwardly, and raise the control valve 28 as shown in Fig. 5, then the radial passages 59 and axial bore 58 of the valve will be shut off and the main or power pump discharge conduit 23 will be brought into communication with the hand pump conduit 36 through the annular valve ports 60, 62, thereby causing the liquid under pressure to rotate the gears of the manual pump 26 in a direction opposite to that of Fig. 1. The liquid under pressure thus passing through the pump 26 besides assisting the operator in turning the steering wheel 28 will pass through the conduit 36 beyond the manual pump and from thence through the annular ports 61 and 63 and conduit 25 to the displacement chamber of the cylinder 11 adjacent the steering gear to cause steering toward the left, referring to Fig. 1. At the same time movement of the piston for the cylinder 10 will cause exhausting of fluid from the displacement chamber of the cylinder 10 and return of said fluid through the conduit 24 and valve to the reservoir. When the parts are in this position it is to be noted that the annular flange 44 obstructs flow from the line 24 into the valve, as shown in Fig. 5, except for the restrictive opening 45. This opening 45 is just large enough to take care of the normal return flow caused by the regular steering rate and is designed so that the rate of flow permitted therethrough is the same as the rate of flow from the power pump 19 when the latter is operating normally. If the wheel should strike an obstruction tending to cause quicker steering movement, this is prevented because the oil can return only as fast as the restrictive port 45 will permit. Thus it is impossible to force more oil into the reservoir than the reservoir can accommodate, and over steering is prevented.

If the steering wheel 78 is turned in a reverse direction from that just described to cause the pins 72 to coact with the slot 70 so as to move the valve sleeve 74 and valve downwardly, then the radial ducts 59 and axial bore of the valve will again be shut off and the main pump discharge conduit 23 will be brought into communication with the hand pump conduit 36 through the annular valve ports 60 and 61, as shown in Figs. 1 and 6, thereby causing the liquid under pressure to rotate the manual pump 26 in the direction indicated in Fig. 1. The liquid under pressure passing through the pump 26, besides assisting the operator in turning the steering wheel 78 in a desired direction, will pass through the conduit 37 beyond the pump and from thence through the annular ports 62 and 64 and conduit 24 to the displacement chamber of the cylinder 10.

Simultaneously the piston of the cylinder 11 will exhaust liquid through the conduit 24, restrictive port 43, and into the reservoir 21. This will cause steering to the right, referring to Fig. 1. In this direction also the single restrictive port 43 will meter the returning fluid so as to prevent over steering.

When the steering wheel is operated to return the valve 28 to the neutral position, after steering in either direction has been effected, the vehicle wheels are held in position by virtue of the fact that the liquid is then confined within the displacement chambers of the cylinders 10 and 11 and within the conduits 24 and 25.

If for any reason the power pump 19 should fail, steering may still be effected by manually turning the hand wheel 78 in either direction. This first causes actuation of the valve as heretofore described, and then because of the splined connection between the sleeve 68 and lower steering column section 27, manual rotation of the gears in the gear pump 26.

When the pistons in the cylinders 10 and 11 reach the end of their stroke while moving in either direction, the pressure in the discharge conduit 23 will rise and the relief valve 34 will then function to relieve the high pressure in the pump discharge conduit by permitting the admitted liquid to escape directly to the supply reservoir 21. The check valve 35 is provided for the purpose of permitting liquid to be withdrawn from the supply reservoir 21 into the manual pump 26 either when the power pump 19 fails or when the steering wheel 78 is operated to actuate the pump 26 faster than the power pump can feed liquid thereto.

In Fig. 7 there is illustrated a modification in which all of the parts of Fig. 2 are utilized except that the manual pump 26 is omitted. In Fig. 7, because of the identity of structure, the same reference numerals as those used in the principal form of the invention are employed wherever applicable and an additional description of the duplicated features of Fig. 7 is believed to be unnecessary. In Fig. 7 the lower steering column section 27 instead of operating a manual pump extends downwardly and is equipped with a worm 85 which coacts with a worm gear 86 in the manner usually employed for vehicle steering. The worm wheel 86 is in turn mounted rigidly on a shaft 87 to which one end of a steering arm 88 is rigidly connected. The other end of the arm 88 has one end of a piston rod 89 pivotally connected thereto, as at 90, and also has a wheel actuating link 91 pivotally connected thereto, as at 92, and extending in the opposite direction. The piston rod 89 is connected to a piston 93 movable in a cylinder 94, and the opposite end of the cylinder has an extension rod 95 which is connectable with one of the wheel swinging levers 18 (referring to Fig. 1). The actuating link 91 is connected to the other wheel swinging lever 18.

As shown in Figs. 7 and 8, the hydraulic connections for the form of Figs. 7 and 8 are the same as illustrated in Fig. 1 except that the manual pump 26 is eliminated. In the modification when the control valve is in a position to cause oil to be forced into the conduit 24 this oil will enter the displacement chamber 96 of the cylinder 94 causing swinging of the vehicle wheels in one direction. At the same time oil from the displacement chamber 97 will be exhausted into the line 25 and forced back into the reservoir through the restrictive exhaust port. When steering in the opposite direction is desired and the valve is in a position to force liquid into the conduit 25, the liquid will be forced into the displacement chamber 97 moving the piston 92 in the opposite direction and causing exhausting of hydraulic medium from the displacement chamber 96 through the conduit 24 back into the reservoir.

It is thus apparent that in the modification steering is normally performed by the power pump 19. It is also apparent, however, that should there be a failure in the power pump 19 or in the hydraulic system connected therewith that direct manual steering through the worm and worm wheel 85 and 86 may be performed. While the worm and worm wheel would normally offer sufficient resistance to turning movement of the lower steering column section during valve actuation, nevertheless in the modification it is preferred to use the friction disks 79, 80, and 80' as in the principal form of the invention. These disks insure a proper resistance to turning movement of the lower steering column section 27 even if there should be wear and resulting slippage between the worm 85 and worm wheel 86.

In both forms of the invention it is apparent that the restrictive ports 43 and 45 eliminate the possibility of the return of liquid to the reservoir at any more than the normal rate, and thus the invention may be employed in connection with road building machinery where abnormal road conditions are encountered which would subject the vehicle wheels to sudden outside forces. It is also apparent that in both forms of the invention the friction disks 79, 80, and 80' insure positive mechanical valve actuation. Likewise in both forms of the invention, in case of failure of the power pump, steering can still be performed manually either through the manual pump 26 or through the worm and worm wheel 85 and 86 of the form of Fig. 7.

From the foregoing detailed description it will be apparent that my present invention provides an improved hydraulic steering system which is extremely simple and compact in construction, and which is moreover highly efficient in operation. The improved steering gear causes the controlled vehicle to positively and quickly partake directional advancements corresponding to the movements of the manually operated steering wheel 78, and slight movement of this wheel will cause slight steering movement of the vehicle wheels, whereas greater movement of the steering wheel 78 will cause correspondingly greater movement of the steering transporting wheels. The improved hydraulic steering assemblage is easily manipulable and sensitive in action, and while the assemblage is normally operable by power in conjunction with the manual control, the system will not fail to function in case the power fails. The hydraulic steering system constituting the present invention is compact and durable in construction and may be readily installed as a unit in vehicles of various types and especially in motor propelled vehicles in which the propelling motor of the vehicle may be utilized to drive the power pump 19. All parts of the improved structure are readily accessible for inspection, adjustment and other attention, and the apparatus may be safely operated by a novice. The system can be quickly refilled with liquid so as to avoid entrapment of air, and the supply reservoir is so located that it will insure an adequate supply of oil to all chambers and conduits at all times.

It should be understood that it is not desired to limit this invention to the exact details of construction or to the exact mode of use herein shown and described for various modifications within the scope of the claims may occur to persons skilled in the art.

What I claim is:

1. In a vehicle steering system, a hydraulic pump, hydraulic steering motor means, a selective valve, conduits forming a circuit for conducting hydraulic medium from said pump through said valve to said steering motor means, and for conducting returned hydraulic medium from said steering motor means back through said valve, said valve having a shiftable member provided with oppositely disposed flanges formed with relatively small openings for causing the flow of returned hydraulic medium from the return conduit portion to pass through an area of less size than the area of said return conduit portion the opening in one of said flanges being effective to meter the flow of returned hydraulic medium when the vehicle is being steered in one direction, and the opening in the other of said flanges being effective to meter the flow when the vehicle is being steered in the opposite direction.

2. In a vehicle steering system, a hydraulic pump, hydraulic steering motor means, a selective valve, conduits forming a circuit for conducting hydraulic medium from said pump through said valve to said steering motor means, and for conducting returned hydraulic medium from said steering motor means back through said valve, said valve having a shiftable member provided with oppositely disposed metering means, one of said means being effective to meter the flow of returned hydraulic medium when the vehicle is being steered in one direction, and the other of said metering means being effective to meter the flow when the vehicle is being steered in the opposite direction.

3. In a vehicle steering system, a hydraulic pump, hydraulic steering motor means, a selective valve, a liquid reservoir, conduits forming a circuit for conducting liquid from said reservoir through said pump and valve to said steering motor means and for conducting returned liquid from said steering motor means back through said valve to said reservoir, said valve having a shiftable member provided with oppositely disposed metering means, one of said means being effective to meter the flow toward the reservoir of returned liquid when the vehicle is being steered in one direction, and the other of said metering means being effective to meter the flow toward the reservoir when the vehicle is being steered in the opposite direction.

4. In a vehicle steering system, a hydraulic pump, hydraulic steering motor means, a selective valve including a shiftable member having flow directing passageways, two conduits leading from said valve to said steering motor means, one or the other of said conduits being a return conduit, depending upon the position of said valve, a reservoir, means for conducting fluid from said reservoir through said pump and valve to one of the conduits leading to the steering motor, means for conducting returned fluid admitted through said valve from the other steering motor conduit to said reservoir, said shiftable member of the valve having oppositely disposed metering means, one of which is effective to meter the return flow from the steering motor and the other of which is ineffective, depending upon the direction of steering.

5. In a vehicle steering system, a steering member having a rotatable steering column comprising a manually operable upper section and a lower section, a hydraulic pump operable by the lower steering column section, hydraulic steering motor means, a valve operable to hydraulically connect said pump to said steering motor means to cause liquid under pressure from said pump to actuate said steering motor means in a selected direction, means in addition to the pump for imposing resistance to turning movement upon said lower steering column section, a connection between the upper steering column section and the lower section whereby the upper steering column section has limited rotation in both directions while the lower section is maintained against rotation by said resistance means, and means between said upper steering column section and said valve to actuate the latter during said limited independent rotation of the upper steering column section.

6. In a vehicle steering system, a steering member having a rotatable steering column comprising a manually operable upper section and a lower section, a hydraulic pump operable by the lower steering column section, hydraulic steering motor means, a valve operable to hydraulically connect said pump to said steering motor means to cause liquid under pressure from said pump to actuate said steering motor means in a selected direction, friction disk means for imposing resistance to turning movement upon said lower steering column section, a connection between the upper steering column section and the lower section whereby the upper steering column section has limited rotation in both directions while the lower section is maintained against rotation by said friction disk means, and means between said upper steering column section and said valve to actuate the latter during said limited independent rotation of the upper steering column section.

7. In a vehicle steering system, a steering member having a rotatable steering column comprising a manually operable upper section and a lower section, a hydraulic pump operable by the lower steering column section, hydraulic steering motor means, a valve operable to hydraulically connect said pump to said steering motor means to cause liquid under pressure from said pump to actuate said steering motor means in a selected direction, a friction disk rotatable with said lower steering column section, a fixed friction plate cooperable with said rotatable disk for imposing resistance to turning movement upon the lower steering column section, a connection between the upper steering column section and the lower section whereby the upper steering column section has limited rotation in both directions while the lower section is maintained against rotation by said friction disk, and means between said upper steering column section and said valve operable to actuate the latter during said limited independent rotation of the upper steering column section.

8. In a vehicle steering system, a steering member having a rotatable steering column comprising a manually operable upper section and a lower section, a hydraulic power driven pump, hydraulic steering motor means, a valve operable to hydraulically connect said pump to said steering motor means to cause liquid under pressure from said pump to operate said steering motor means in a selected direction, friction disk means for imposing resistance to turning movement upon said lower steering column section, a connection between the upper steering column section and the lower section whereby the upper steering column section has limited rotation in both directions while the lower section is maintained against rotation by said friction disk means, means between said upper steering column section and said valve operable to actuate the latter during said limited independent rotation of the upper steering column section, and means in addition to the power driven pump for causing steering of the vehicle in response to rotation of the lower steering column section.

9. In a vehicle steering system, a steering member having a rotatable steering column comprising a manually operable upper section and a lower section, a hydraulic power driven pump, hydraulic steering motor means, a valve operable to hydraulically connect said pump to said steering motor means to cause liquid under pressure from said pump to operate said steering motor means in a selected direction, friction disk means for imposing resistance to turning movement upon said lower steering column section, a connection between the upper steering column section and the lower section whereby the upper steering column section has limited rotation in both directions while the lower section is maintained against rotation by said friction disk means, means between said upper steering column section and said valve operable to actuate the latter during said limited independent rotation of the upper steering column section, and a second hydraulic pump hydraulically connected with the hydraulic steering motor means actuated by rotation of the lower steering column section.

10. In a vehicle steering system, a steering member having a rotatable steering column comprising a manually operable upper section and a lower section, a hydraulic power driven pump, hydraulic steering motor means, a valve operable to hydraulically connect said pump to said steering motor means to cause liquid under pressure from said pump to operate said steering motor means in a selected direction, friction disk means for imposing resistance to turning movement upon said lower steering column section, a connection between the upper steering column section and the lower section whereby the upper steering column section has limited rotation in both directions while the lower section is maintained against rotation by said friction disk means, means between said upper steering column section and said valve operable to actuate the latter during said limited independent rotation of the upper steering column section, and mechanical steering connections operated by rotation of the lower steering column section for causing steering independently of the power driven pump.

11. In a vehicle steering system, a steering member having a rotatable steering column comprising a manually operable upper section and a lower section, a hydraulic pump, hydraulic steering motor means, a valve operable to hydraulically connect said pump to said steering motor means to cause liquid under pressure from said pump to operate said motor means in a selected direction, a vertically movable sleeve surrounding the upper steering column section and slidable longitudinally thereon and having a splined connection with the lower steering column section, means for causing limited longitudinal movement of said sleeve when said upper steering column section is rotated in either direction, and a slidable valve actuating member for transmitting longitudinal movement from said sleeve to said valve.

12. In a vehicle steering system, a steering member having a rotatable steering column comprising a manually operable upper section and a lower section, a hydraulic pump, hydraulic steering motor means, a valve operable to hydraulically connect said pump to said steering motor means to cause liquid under pressure from said pump to operate said motor means in a selected direction, a vertically movable sleeve surrounding the upper steering column section and slidable longitudinally thereon and having a splined connection with the lower steering column section, means for causing limited longitudinal movement of said sleeve when said upper steering column section is rotated in either direction, a slidable valve actuating member for transmitting longitudinal movement from said sleeve to said valve, and a guide rod for said sleeve on which the latter is slidable.

13. In a vehicle steering system, a steering member having a rotatable steering column comprising a manually operable upper section and a lower section, a hydraulic pump, hydraulic steering motor means, a valve operable to hydraulically connect said pump to said steering motor means to cause liquid under pressure from said pump to operate said motor means in a selected direction, a vertically movable sleeve surrounding the upper steering column section and slidable longitudinally thereon and having a splined connection with the lower steering column section, means for causing limited longitudinal movement of said sleeve when said upper steering column section is rotated in either direction, and a slidable valve actuating member having lateral projections connected to said sleeve and valve for transmitting longitudinal movement from said sleeve to said valve.

14. In a vehicle having an axle and having steerable wheels swingably supported at the ends of said axle, a wheel swinging lever connected to each wheel, two hydraulic steering motors extending in opposite directions from each other, each motor being pivotally connected at one end to an intermediate portion of the axle and at its other end to one of the wheel swinging levers, each steering motor including an elongated cylinder having a piston movable therein, a rotatable steering column on the vehicle including a manually operable upper section and a lower section, an hydraulic power driven pump, means including a valve operable to hydraulically connect said pump to one or the other of said steering motors to cause liquid under pressure from said pump to steer the wheels in a selected direction, means including a connection between the upper steering column section and the lower section whereby the upper steering column section has limited rotation in both directions prior to rotation of the lower section, means between the upper steering column section and said valve operable to actuate the latter during said limited independent rotation of the upper steering column section, and means in addition to the power driven pump for causing steering of the vehicle in response to rotation of the lower steering column section.

15. In a vehicle having an axle and having steerable wheels swingably supported at the ends of said axle, a wheel swinging lever connected to each wheel, two single acting hydraulic steering motors extending in opposite directions, from each other, each motor being pivotally connected at one end to an intermediate portion of the axle and at its other end to one of the wheel swinging levers, each steering motor including an elongated cylinder having a piston movable therein, a rotatable steering column on the vehicle including a manually operable upper section and a lower section, an hydraulic power driven pump, means including a valve operable to hydraulically connect said pump to one or the other of said steering motors to cause liquid under pressure from said pump to steer the wheels in a selected direction, means including a connection between the upper steering column section and the lower section whereby the upper steering column section has limited rotation in both directions prior to rotation of the lower section, means between the upper steering column section and said valve operable to actuate the latter during said limited independent rotation of the upper steering column section, and means in addition to the power driven pump for causing steering of the vehicle in response to rotation of the lower steering column section.

16. In a vehicle having an axle and having steerable wheels swingably supported at the ends of said axle, a wheel swinging lever connected to each wheel, a tie rod pivotally connected at its ends to said wheel swinging levers, two hydraulic steering motors positioned between the axle and tie rod and extending in opposite directions from each other, each motor being pivotally connected at one end to an intermediate portion of the axle and at its other end to one of the wheel swinging levers, each steering motor including an elongated cylinder having a piston movable therein, a rotatable steering column on the vehicle including a manually operable upper section and a lower section, an hydraulic power driven pump, means including a valve operable to hydraulically connect said pump to one or the other of said steering motors to cause liquid under pressure from said pump to steer the wheels in a selected direction, means including a connection between the upper steering column section and the lower section whereby the upper steering column section has limited rotation in both directions prior to rotation of the lower section, means between the upper steering column section and said valve operable to actuate the latter during said limited independent rotation of the upper steering column section, and means in addition to the power driven pump for causing steering of the vehicle in response to rotation of the lower steering column section.

HENRY C. FRENCH.